United States Patent
Yokokura

(10) Patent No.: US 8,115,965 B2
(45) Date of Patent: Feb. 14, 2012

(54) IMAGE PROCESSING APPARATUS, CONTROL METHOD THEREFOR, AND STORAGE MEDIUM

(75) Inventor: Hidenori Yokokura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 518 days.

(21) Appl. No.: 12/041,419

(22) Filed: Mar. 3, 2008

(65) Prior Publication Data

US 2008/0218806 A1    Sep. 11, 2008

(30) Foreign Application Priority Data

Mar. 7, 2007   (JP) .................. 2007-057372

(51) Int. Cl.
    *H04N 1/40* (2006.01)
(52) U.S. Cl. ........................ 358/3.28; 358/468
(58) Field of Classification Search .......... 358/1.9, 358/2.1, 3.28, 500, 504, 400, 406, 468; 382/116, 382/119
    See application file for complete search history.

(56) References Cited

U.S. PATENT DOCUMENTS

| | | | | |
|---|---|---|---|---|
| 6,038,035 A | * | 3/2000 | Wulforst .................. | 358/406 |
| 6,538,769 B2 | * | 3/2003 | Yoshida et al. ............ | 358/1.9 |
| 6,628,412 B1 | * | 9/2003 | Jeran et al. ............... | 358/1.14 |
| 6,744,906 B2 | * | 6/2004 | Rhoads et al. ............. | 382/100 |
| 6,901,236 B2 | * | 5/2005 | Saitoh et al. .............. | 399/366 |
| 6,917,724 B2 | * | 7/2005 | Seder et al. ............... | 382/321 |
| 6,970,259 B1 | * | 11/2005 | Lunt et al. ................ | 358/1.14 |

FOREIGN PATENT DOCUMENTS

JP    2004-228897 A    8/2004

* cited by examiner

*Primary Examiner* — Thomas D Lee
*Assistant Examiner* — Stephen N Brinich
(74) *Attorney, Agent, or Firm* — Rossi, Kimms & McDowell LLP

(57) ABSTRACT

An image processing apparatus which makes it possible to change the manner of authentication between cases where restriction of a specific process is performed on an image of an original, as an original document, and where the restriction of the specific process is performed on an image of an original, as a copy of the original document. A scanner reads an image on an original. An embedded information-extracting section extracts specific information contained in the read image. A determining section determines based on the extracted information whether or not the original is an original document. An authenticating section performs authentication using respective difference pieces of authentication information in cases where the original is determined to be an original document and where the original is not. A copy operation control section restricts the specific process based on the image, according to a result of the authentication.

8 Claims, 9 Drawing Sheets

| KIDS OF PASSWORD | PASSWORD |
|---|---|
| MASTER PASSWORD | aaa |
| GENERAL PASSWORD | x35y76aaa |

401 — MASTER PASSWORD row
402 — GENERAL PASSWORD row

IMAGE PROCESSING APPARATUS, CONTROL METHOD THEREFOR, AND STORAGE MEDIUM

BACKGROUND OF THE INVENTION

1. Field of the Invention

The present invention relates to an image processing apparatus, a control method therefor, and a storage medium.

2. Description of the Related Art

There has been proposed a method of restricting the copying of an original (see Japanese Patent Laid-Open No. 2004-228897. In this method, information embedded in an original, e.g. a password for removing the inhibition of the copying of the original is extracted from the original, and based on the extracted password and a password input by the user, the inhibition of copying the original is removed.

In the above-mentioned method, the password embedded in the original for removing the inhibition of copying thereof is fixed. Therefore, even when the copying of an original document and the copying of a copy of the original document can be discriminated from each other, it is impossible to change respective passwords necessary for being permitted to copy them. As a result, it is difficult to restrict the copying of an original document and that of a copy of the original document, differently by changing authentication information therefor.

SUMMARY OF THE INVENTION

The present invention provides an image processing apparatus which makes it possible to change the manner of authentication between a case where restriction of a specific process is performed on an image of an original, which is an original document, and a case where the restriction of the specific process is performed on an image of an original, which is not an original document, a control method therefor, and a storage medium.

In a first aspect of the present invention, there is provided an image processing apparatus comprising a reader unit configured to read an image on an original, an extracting unit configured to extract specific information contained in the image read by the reader unit, a determining unit configured to determine based on the information extracted by the extracting unit whether or not the original is an original document, an authenticating unit configured to perform authentication using respective difference pieces of authentication information in respective cases where the original is determined to be an original document and where the original is not determined to be an original document, and a control unit configured to restrict the specific process based on the image read by the reader unit, according to a result of the authentication by the authenticating unit.

With the configuration of the image processing apparatus according to the first aspect of the present invention, it is possible to change the manner of authentication between a case where restriction of a specific process is performed on an image of an original, which is an original document, and a case where the restriction of the specific process is performed on an image of an original, which is not an original document.

For example, it is possible to control users who are to be permitted to copy an original document and users who are to be permitted to copy a copy of the original document in a discriminating manner, whereby different levels of security can ensured for the respective types of copying.

The extracting unit is capable of extracting first information which is lost by copying of an original document, and second information which is not lost by copying of an original document, and the determining unit can determine that the original is an original document when the first information and the second information are extracted by the extracting unit, and can determine that the original is not an original document when the second information is extracted by the extracting unit without the first information being extracted by the extracting unit.

The authenticating unit can use the first information as the authentication information when the original is determined to be an original document, and can use the second information as the authentication information when the original is not determined to be an original document.

The second information is either a password or address information of an authentication server that determines whether the specific process on the original is to be permitted.

The extracting unit is capable of extracting background pattern information appearing as a background pattern on a copy obtained by copying of an original document, and the determining unit can determine that the original is an original document when the background pattern information is extracted by the extracting unit, and can determine that the original is not an original document when the background pattern information is not extracted by the extracting unit.

The extracting unit is capable of extracting copy information added to a copy of an original document for indicating that the original is a copy of the original document, and the determining unit can determine that the original is an original document when the copy information is not extracted by the extracting unit, and can determine that the original is not an original document when the copy information is extracted by the extracting unit.

The first information can be embedded as a dot pattern formed of a plurality of small dots seemingly randomly arranged, and the second information can be embedded as a dot pattern formed of a plurality of large dots seemingly randomly arranged.

The image processing apparatus comprises a display unit configured to display error occurrence information indicating occurrence of an error, when the control unit restricts the specific process based on the image read by the reader unit.

In a second aspect of the present invention, there is provided an image processing apparatus comprising an extracting unit configured to extract from an original a first password embedded as a dot pattern of large dots, and a second password embedded as a dot pattern of small dots, and an authenticating unit configured to cause an image demanding the second password to be displayed for copying of the original, when the second password is extracted by the extracting unit, and cause an image demanding the first password to be displayed for copying of the original, when the first password is extracted by the extracting unit.

In a third aspect of the present invention, there is provided an image processing apparatus comprising an extracting unit configured to extract from an original a first password embedded as a dot pattern of large dots, and a second password embedded as a dot pattern of small dots, and an authenticating unit configured to cause an image demanding the second password of the two passwords to be displayed for copying of the original, when both of the first password and the second password are extracted by the extracting unit, and cause an image demanding the first password to be displayed for copying of the original, when the first password of the two passwords is extracted by the extracting unit.

In a fourth aspect of the present invention, there is provided an image processing apparatus comprising an extracting unit configured to extract from an original a second password necessary for copying of an original document, and a first password necessary for copying a copy of the original document, and an authenticating unit configured to cause an image demanding the second password of the two passwords to be displayed for copying of the original, when both of the first password and the second password are extracted by the extracting unit, and cause an image demanding the first password to be displayed for copying of the original when the first password of the two passwords is extracted by the extracting unit.

In a fifth aspect of the present invention, there is provided an image processing method comprising an extraction step of extracting from an original a second password necessary for copying of an original document, and a first password necessary for copying a copy of the original document, and an authentication step of causing an image demanding the second password of the two passwords to be displayed for copying of the original, when both of the first password and the second password are extracted in the extracting step, and causing an image demanding the first password to be displayed for copying of the original, when the first password of the two passwords is extracted in the extracting step.

In a sixth aspect of the present invention, there is provided a storage medium storing a program for causing a computer to execute an image processing method, wherein the image processing method comprises an extraction step of extracting from an original a second password necessary for copying of an original document, and a first password necessary for copying a copy of the original document, and an authentication step of causing an image demanding the second password of the two passwords to be displayed for copying of the original, when both of the first password and the second password are extracted in the extracting step, and causing an image demanding the first password to be displayed for copying of the original, when the first password of the two passwords is extracted in the extracting step.

The features and advantages of the invention will become more apparent from the following detailed description taken in conjunction with the accompanying drawings.

DETAILED DESCRIPTION OF THE EMBODIMENTS

The present invention will now be described in detail with reference to the drawings showing preferred embodiments thereof.

Figure 1:
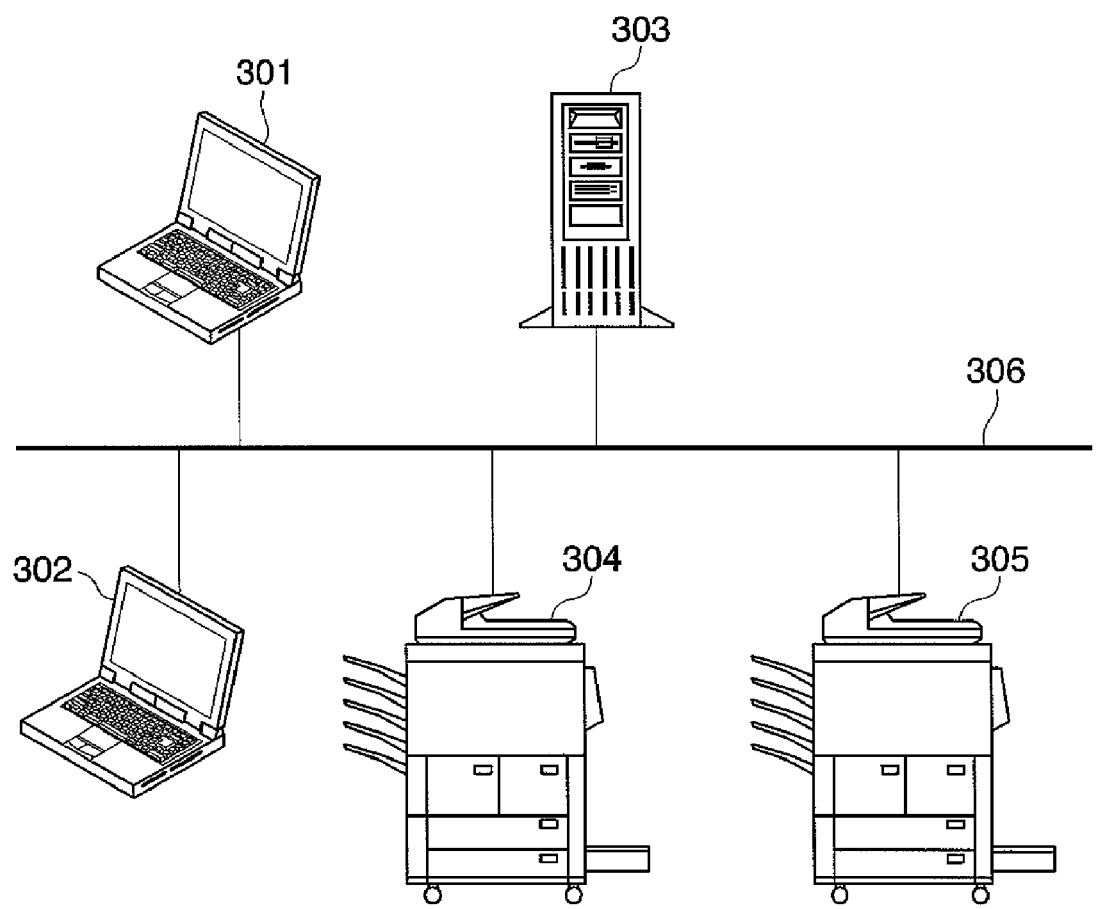
FIG. 1 is a diagram showing the configuration of a network system incorporating an image processing apparatus according to a first embodiment of the present invention.

FIG. 1 is a diagram showing the configuration of a network system incorporating an image processing apparatus according to a first embodiment of the present invention.

As shown in FIG. 1, a plurality of image processing apparatuses 304 and 305 are connected to a LAN (Local Area Network) 306. Further, a plurality of client PCs and a server 303 are also connected to the LAN 306. Each of the image processing apparatuses 304 and 305 has a plurality of functions including a scanner function, a printer function, and a copy function, as well a function of communicating with the client PCs 301 and 302 and the server 303 which are connected to the LAN 306.

The client PCs 301 and 302 each generate print data in response to a user's operation, and sends the print data to the image processing apparatus 304 or 305 (hereinafter designated as "304 (305)") via the LAN 306. The image processing apparatus 304 (305) interprets the print data received from the client PC 301 or 302 (hereinafter designated as "301 (302)") to convert the same into image data, and prints an image based on the image data on a sheet. Further, the print data generated by the client PC 301 (302) is sometimes sent to the image processing apparatus 304 (305) by way of the server 303, for printing.

Figure 2:
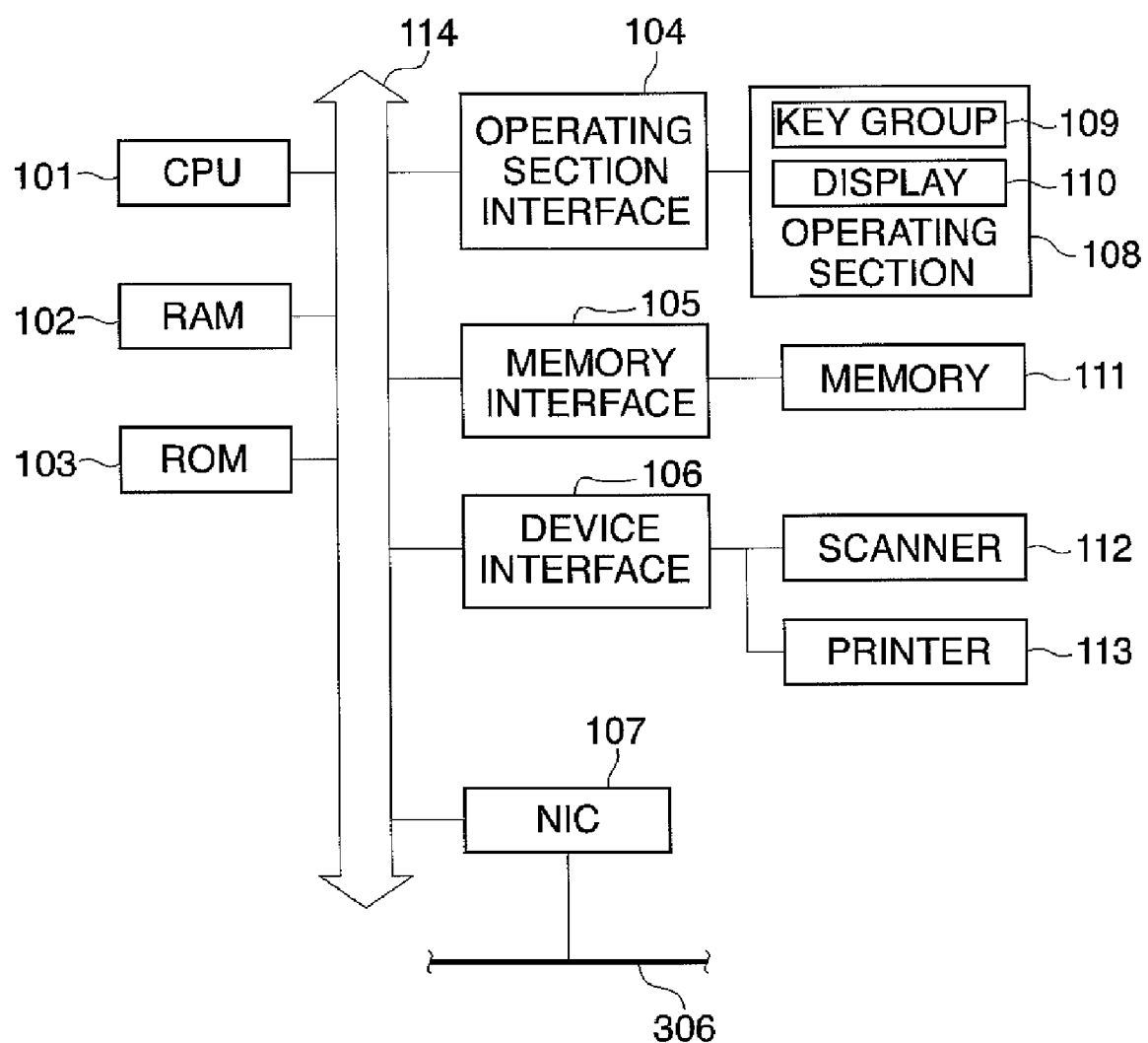
FIG. 2 is a block diagram showing the internal construction of the image processing apparatus in FIG. 1.

A description will be given of the internal construction of the image processing apparatuses 304 (305) with reference to FIG. 2. FIG. 2 is a block diagram showing the internal construction of the image processing apparatus 304 (305) in FIG. 1.

The image processing apparatus 304 (305) is comprised of a CPU 101, a RON 103 storing programs executed by the CPU 101, and a RAM 102 providing a work area for the CPU 101. The CPU 101 executes the programs stored in the ROM 103 using the RAM 102 as the work area, to thereby perform the overall control of the apparatus and individual processes.

The CPU 101 is connected to an operating section interface 104, a memory interface 105, a device interface 106, and a network interface card (NIC) 107, via a system bus 114.

The operating section interface 104 controls the reception of information input from the operating section 108, and the display of information on the operating section 108. The operating section 108 includes a key group 109, and a display 110 formed e.g. by a liquid crystal panel. The key group 109 is comprised of a plurality of keys operated for selection of a function, setting of a mode, inputting of numerical values, a password, etc., and so forth. The display 110 displays information input via the operating section interface 104 (e.g. various configuration screens and details of settings configured on each configuration screen).

The memory interface 105 controls the write of data into and the read of data from a memory 111 (e.g. a hard disk, a USB memory, a memory card, or a RAM) for storing data including image data and user-related data.

The device interface 106 controls a scanner 112 and a printer 113. The scanner 112 reads an image on an original, and outputs image data obtained by reading the image. The printer 113 is formed by a laser printer that forms an image on a sheet based on image data. Further, as the printer 113, it is also possible to use a printer based on another printing method, such as an inkjet printer.

The network interface card (NIC) 107 performs communication with the client PCs 301 and 302 and the server 303 connected thereto via the LAN 306, and sends and receives data to and from them.

Figure 3:
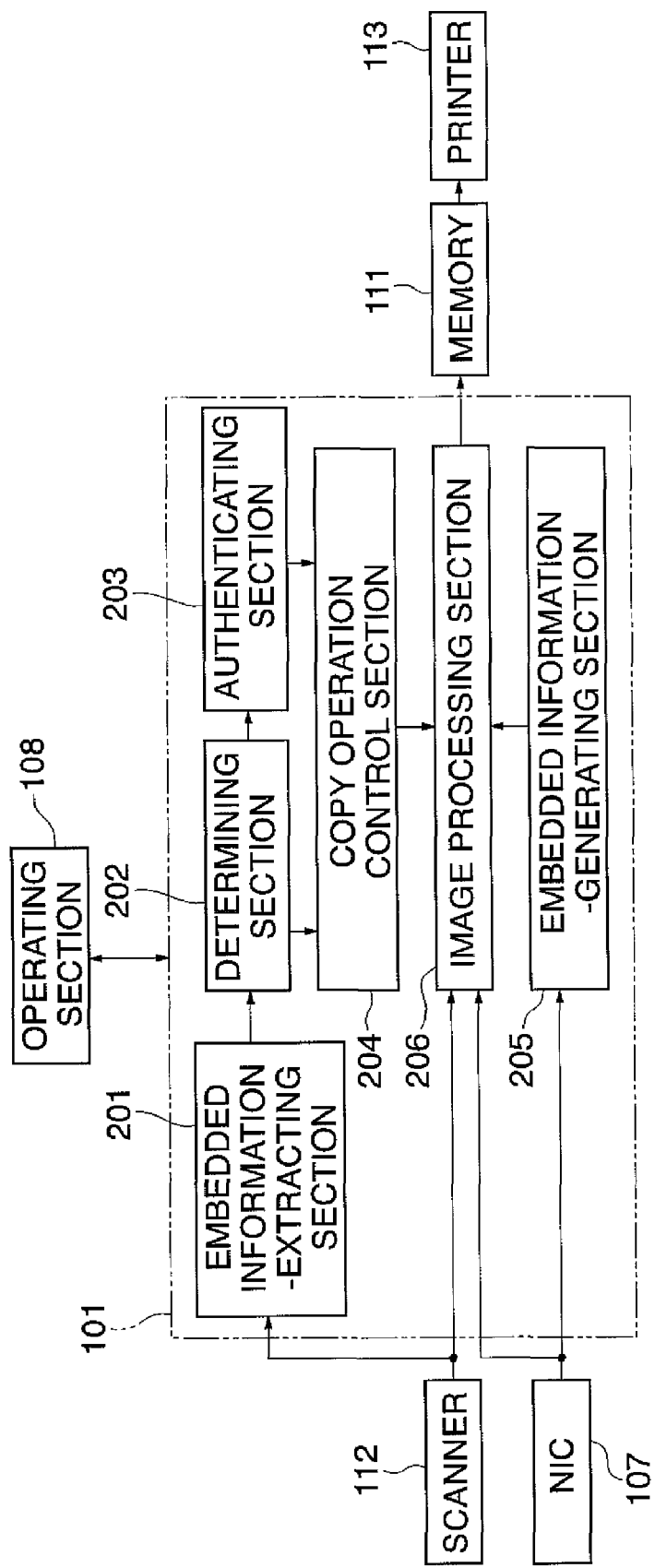
FIG. 3 is a functional block diagram of functions of the FIG. 1 image processing apparatus for restricting copying and generating a printed document in which information indicating a set copying condition is embedded, in copying an original.
Figures 4, 5:
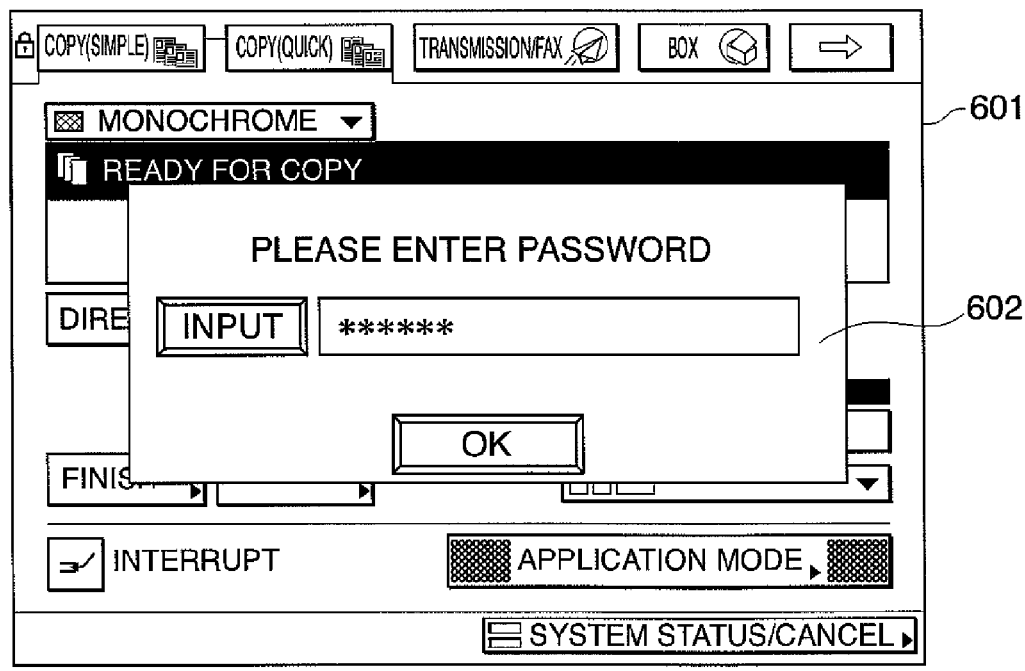
FIG. 4 is a view showing respective examples of a master password and a general password which are embedded in an original.
FIG. 5 is a view showing an example of a password input dialog displayed on a display of an operating section of the image processing apparatus, when a copying condition is set for an original to be copied this time such that the copying of the original is permitted by authentication using a password.

Next, the configuration of the functions of the image processing apparatus 304 (305) for restricting copying and generating a printed document in which information indicating a set copying condition is embedded, in copying an original, will be described with reference to FIGS. 3 and 4. FIG. 3 is a functional block diagram the functions of the image processing apparatus 304 (305) in FIG. 1 for restricting copying and generating a printed document in which information indicating a set copying condition is embedded, in copying an original. FIG. 4 is a view showing respective examples of a master password and a general password which are embedded in an original.

The CPU 101 executes a program stored in the ROM 103, thereby forming an embedded information-extracting section 201, a determining section 202, an authenticating section 203, a copy operation control section 204, an embedded information-generating section 205, and an image processing section 206.

The embedded information-extracting section 201 analyzes image data obtained by the reading operation of the scanner 112, and extracts embedded information which is embedded in the image read from the original. The embedded information shows a copying condition set for the original for restricting the copying of an original. Now, as referred to hereinafter, the copying condition includes the respective conditions of "copy permitted", "copy inhibited", and "copy permitted based on authentication using a password", and one of theses conditions is set for the original by the client PC 301 (302).

In the case of an original for which the copying condition of "copy permitted" is set, no information concerning a copying condition is embedded. That is, the fact that there is no embedded information in the original indicates that the permission of copying is set for the original. Instead of this, information indicating the permission of copying may be embedded in the original.

Further, if the original has "copy inhibited" set therefor as the copying condition, the embedded information indicating the inhibition of copying is embedded in the original.

If the original has "copy permitted based on authentication using a password" set therefor as the copying condition, the copying of the original is permitted depending on authentication using a password. Therefore, in such an original, two passwords, i.e. first and second passwords (authentication information) used for authentication for enabling copying (or authentication for removing inhibition of copying) are embedded as the embedded information indicating the copy condition. The first password (hereinafter referred to as "the master password") enables copying of an original document, whereas the second password (hereinafter referred to as "the general password") enables copying of a copy of the original document.

Here, the information embedded in the original as the copying condition is expressed by a dot pattern formed of a large number of dots seemingly randomly arranged. The dot pattern is formed such that it expresses a low visibility barcode (LVBC) which is very low in visibility. The dot pattern corresponding to the embedded information is extracted from image data obtained by reading an image of an original. Then, the information (copying condition) embedded in the original is extracted by the analysis of the extracted dot pattern.

The master password (first information) is represented by a dot pattern of dots which are so small that they are lost due to copy characteristics when an original document is copied. In contrast, the general password (second information) is represented by a dot pattern of dots which are large enough not to be lost but be preserved even after the original document having the general password embedded therein is copied.

As to the passwords, in the illustrated example, "aaa" is set as the master password 401, and "x35y76aas" is set as the general password, as shown in FIG. 4. These passwords are notified to the associated users. That is, the master password is notified to the users who are permitted to copy the original document, and the general password is notified to the users who are permitted to copy a copy of the original document.

Further, as each of the passwords, different ones are used on an original document basis. To vary the passwords on an original document basis, it is necessary to manage them on an original document basis, but this enables an even higher level of security to be ensured. In this case, the users who are permitted to copy the original document are notified of identification information including a document ID assigned to the original document and the master password associated therewith. Further, the users who are permitted to copy the copy of the original document are notified of the document ID assigned to the original document, and the general password associated therewith.

The embedded information-extracting section 201 extracts the master password and the general password while distinguishing between them. For example, it is possible to configure the embedded information-extracting section 201 such that it can determine from the number of characters of each extracted password whether the password is a master password or a general password. In this case, the master password and the general password are set such that the respective ranges of numbers of characters forming the passwords, which are associated with the respective passwords, do not overlap each other. It may be determined whether the extracted password is a master password or a general password, depending on whether it is extracted from a dot pattern of small dots or a dot pattern of large dots.

The determining section 202 determines which of "copy permitted", "copy inhibited", and "copy permitted based on authentication using a password" the copying condition set for the original read this time is. Further, in the case of the copying condition being "copy permitted based on authentication using a password", the determining section 202 determines whether the original read this time is an original document, or a copy of the original document.

More specifically, when the embedded information extracted this time indicates permission of copying, it is determined that the copy condition of "copy permitted" is set for the original (original to be copied) read this time. Further, when no embedded information is detected from the original (when the original has no embedded information), it is determined that the copying condition of "copy permitted" is set for the original read this time.

Further, when the extracted embedded information indicates inhibition of copying, it is determined that the copying condition of "copy inhibited" is set for the original read this time.

When the extracted embedded information includes both of the master password and the general password or only the general password, it is determined that the copying condition of "copy permitted based on authentication using a password" is set for the original read this time. Then, when it is determined that the copying condition of "copy permitted based on authentication using a password" is set for the original read this time, it is determined whether the original read this time is an original document or a duplicate (or copy) thereof. In the present embodiment, when the extracted embedded information includes both of the master password and the general password, the original read this time is determined to be an original document. On the other hand, when the extracted embedded information includes only the general password, the original read this time is determined to be a copy of the original document.

When the original is determined to be an original document, the authenticating section 203 performs authentication using a master password (first information) so as to permit copying of the original. On the other hand, when the original is determined to be a copy of the original document, the authenticating section 203 performs authentication using a general password (second information) so as to permit copying of the original.

In performing authentication using the master password or the general password, a password input screen is displayed on the display 110 of the operating section 108. Then, the authenticating section 203 determines whether a password input from the password input screen by the user matches the master password or the general password.

The copy operation control section 204 permits or inhibits a copying operation depending on the results of determination by the determining section 202. More specifically, the copy operation control section 204 permits a copying operation when the determining section 202 determines that the copying condition of "copy permitted" is set for the original read this time. On the other hand, the copy operation control section 204 inhibits a copying operation when the determining section 202 determines that the copying condition of "copy inhibited" is set for the original read this time. Further, when the determining section 202 determines that the copying condition of "copy permitted based on authentication using a password" is set for the original read this time, the copy operation control section 204 fetches the result of authentication by the authenticating section 203, and permits or inhibits a copying operation depending on the result of authentication.

Here, if the copying operation is permitted, the image processing section 206 performs a predetermined image process on image data input from the scanner 112, and delivers the processed image data to the printer 113. That is, a copy of the original formed by the copying operation is output. On the other hand, if the copying operation is inhibited, the predetermined image process by the image processing section 206 on the image data input from the scanner 112 is aborted. This abortion is regarded as occurrence of an error, and error occurrence information indicating occurrence of an error is displayed on the display 110 of the operating section 108. Thus, when the copying operation is inhibited, the copying operation is aborted so that the copy of the original by the copying operation is not output.

The embedded information-generating section 205 generates a dot pattern corresponding to information indicating the copying condition set by the client PC 301 (302) when generating a printed document as an original document. Here, if the copying condition of "copy permitted based on authentication using a password" is set, the aforementioned dot pattern of small dots indicative of the master password and dot pattern of large dots indicative of the general password are generated.

The generated dot patterns are input to the image processing section 206, which converts print data input from the PC 301 (302) to image data interpretable by the printer 113, and the resulting image data and the aforementioned dot patterns are synthesized. The image data having the dot patterns synthesized therewith is delivered to the printer 113, whereupon the printer 113 prints an image in which the dot patterns corresponding to the information indicative of the copying condition are embedded, on a sheet, and delivers the printed sheet as a printed document (original document).

Thus, the printed document (original document) having the master password and the general password embedded therein is formed, whereby it is possible to control the permission or inhibition of copying of the printed document or a copy of the printed document, by authentication.

Next, a description will be given of a password input dialog displayed on the display 110 of the operating section 108 when the copying condition of "copy permitted based on authentication using a password" is set for the original read this time, with reference to FIG. 5. FIG. 1 is a view illustrating an example of the password input dialog displayed on the display 110 of the operating section 108 when the copying condition of "copy permitted based on authentication using a password" is set for the original to be copied this time.

If the copying condition of "copy permitted based on authentication using a password" is set for the original read this time, the password input dialog is displayed on an operation screen 601 which is displayed on the display 110 of the operating section 108, as shown in FIG. 5. To the password input dialog, the user inputs a password using the key group 109 of the operating section 108. If the input password matches the password indicated by the embedded information extracted from the original, the authentication is successful. In this case, the password input dialog is closed and the copying operation is permitted. In other words, the original is copied, and a copy thereof is output.

On the other hand, if the input password does not match the password indicated by the embedded information extracted from the original, the authentication is unsuccessful or fails. In this case, the copying operation is inhibited, and a message indicating occurrence of an error is displayed on the operating section 108. In other words, the original is inhibited from being copied.

Figure 6:
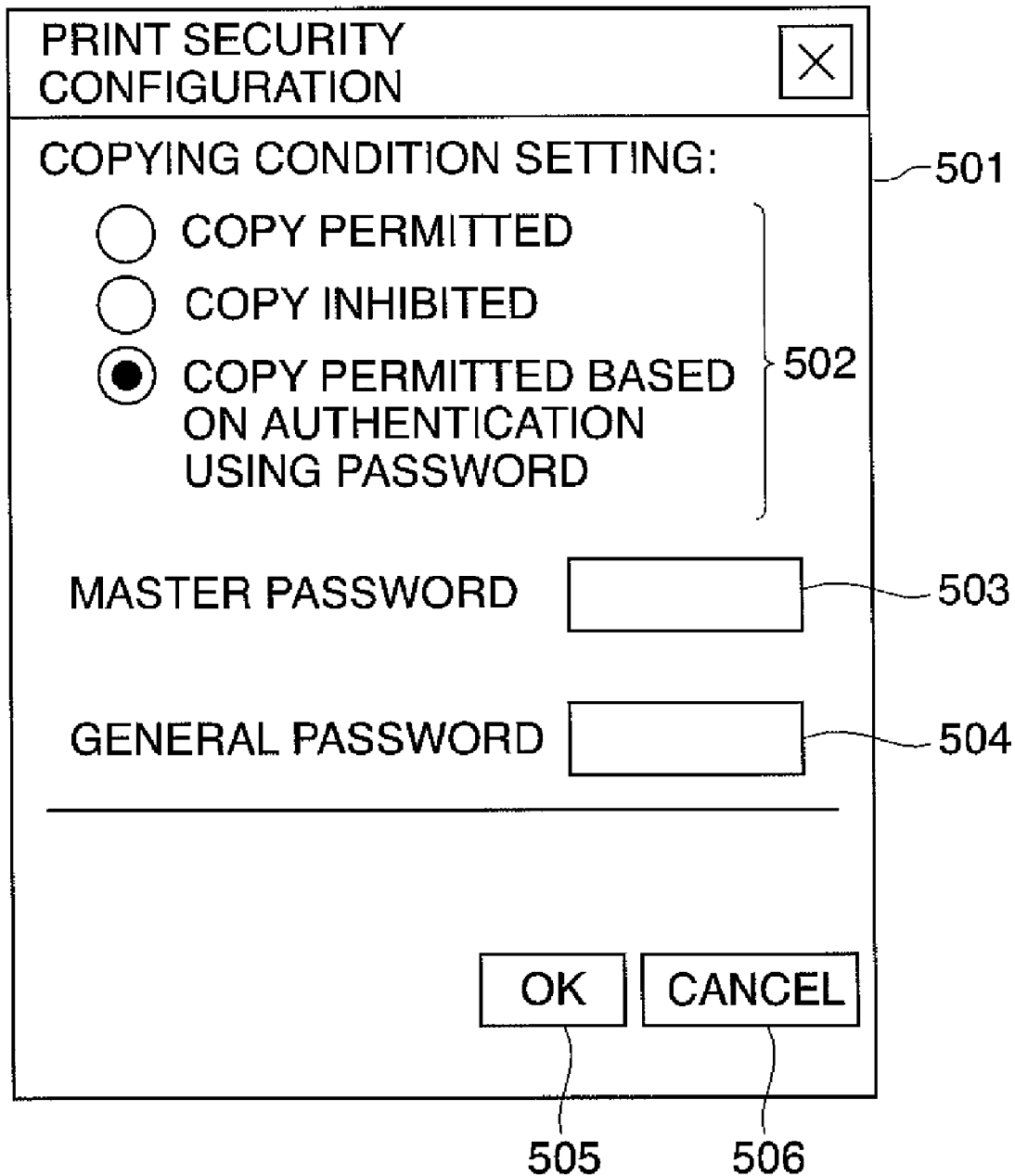
FIG. 6 is a view showing an example of a print security configuration dialog displayed by a printer driver incorporated in a client PC in FIG. 1.

Next, a description will be given of the configuration of the copying condition by the client PC 301 (302), with reference to FIG. 6. FIG. 6 is a view showing an example of a print security configuration dialog displayed by a printer driver incorporated in the client PC 301 (302) appearing in FIG. 1.

The client PC 301 (302) displays the print security configuration dialog 501 shown in FIG. 6 by the associated printer driver. The print security configuration dialog 501 is for configuring the copying condition for a printed document, and by setting the copying condition, it is possible to ensure the security of the printed document.

As mentioned hereinabove, there are three copying conditions: "copy permitted", "copy inhibited", and "copy permitted based on authentication using a password", and radio buttons 502 for selecting one of them are provided on the print security configuration dialog 501. The user is capable of selecting and setting one of the three copying conditions by operating the associated one of the radio buttons.

Here, if "copy permitted based on authentication using a password" is selected, two password input fields 503 and 504 are enabled for input. A master password for permitting copying of an original document is input to the password input field 503, while a general password for permitting copying of a copy of the original document is input to the password input field 504.

With one of the three copying conditions being selected, if the user depresses an OK button 505, the selected copying condition is set. To cancel the set copying condition, a cancel button 506 is depressed.

Information on the thus set copying condition and the password(s) are transmitted together with pint data to the image processing apparatus 304 (305), whereby the print data is converted to image data interpretable by the printer 113, and the image data and a dot pattern corresponding to the information indicating the copying condition are synthesized. A dot pattern or dot patterns indicating the password(s) is/are also synthesized with the image data, as required. Then, the image processing apparatus 304 (305) forms an image including the dot pattern(s) on a sheet. This makes it possible to obtain a printed document in which the information indicating the copying condition is embedded.

Although the present embodiment shows an example in which the copying condition is set by the client PC 301 (302), it is also possible to configure such that the image processing apparatus 304 (305) is capable of setting a copying condition. In this case, it is only required to display a dialog similar to the printing security configuration dialog on the operating section 108.

Figure 7:
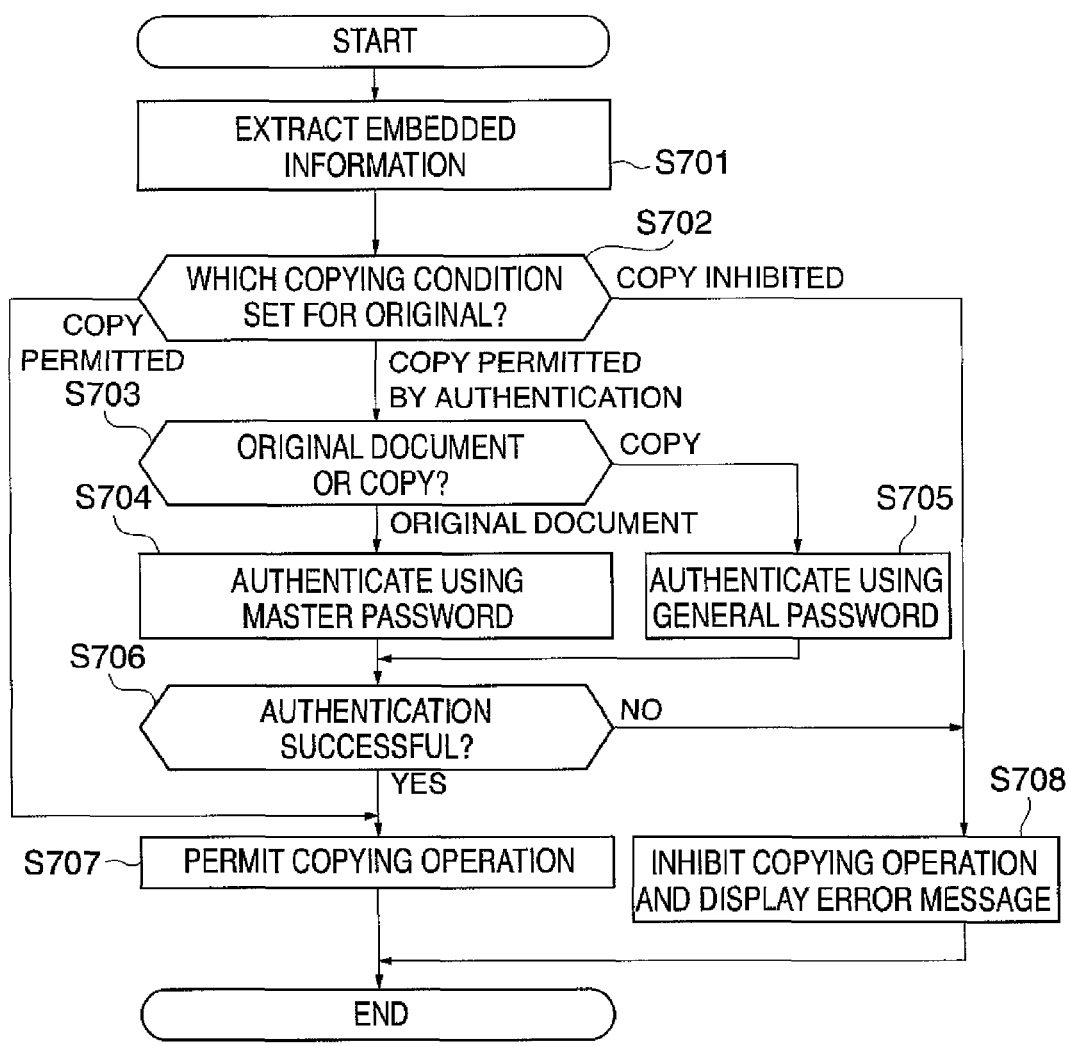
FIG. 7 is a flowchart of a copy control process executed by the image processing apparatus in FIG. 1.

Next, a description will be given of the control of a copying operation by the image processing apparatus 304 (305) with reference to FIG. 7. FIG. 7 is a flowchart of a copy control process executed by the image processing apparatus 304 (305) in FIG. 1. This process is executed by the CPU 101 according to a program stored in the ROM 103, for each original read by the scanner 112.

When the user inputs a copy start instruction, reading of an image of an original set on the scanner 112 is started. The image data obtained by the reading of the original is sent from the scanner 112 to the CPU 201 via the device interface 106.

As shown in FIG. 7, the CPU 101 analyzes image data sent form the scanner 112, and extracts embedded information embedded in the read image data (step S701). If embedded information is extracted, it is determined based on the extracted embedded information which of "copy permitted", "copy inhibited", and "copy permitted based on authentication using a password" is set (step S702). Here, there are a case where both of the master password and the general password are extracted as the embedded information and a case where only the general password is extracted as the embedded information. In such cases, it is determined that "copy permitted based on authentication using a password" is set as the copying condition. On the other, if no embedded information is extracted, the CPU 101 determines that "copy permitted" is set.

If "copy permitted" is set for the original read this time, the CPU 101 permits a copying operation (step S707). This causes the image processing section 206 to perform a predetermined image process on the image data, and then convert the processed image data into image data which the printer 113 can interpret. The resulting image data is once stored in the memory 111, and then sent to the printer 113. The printer 113 forms an image on a sheet based on the image data, and outputs the sheet i.e. a copy of the original.

If "copy inhibited" is set for the original read this time, the CPU 101 inhibits a copying operation, and causes error occurrence information to be displayed on the display 110 (step S708). This stops copying of the original read this time, so that a copy thereof is not output.

If "copy permitted based on authentication using a password" is set for the original read this time, the CPU 101 determines whether or not the original read this time is an original document or a copy of the original document (step S703). Here, if both the master password and the general password are extracted as the embedded information of the original, it is determined that the original read this time is an original document, whereas if only the general password is extracted but the master password is not extracted, it is determined that the original read this time is a copy of the original document.

If it is determined in the step S703 that the original read this time is an original document, the CPU 101 performs authentication using the master password so as to permit copying of the original (step S704). In this authentication, the password input screen is displayed on the display 110 of the operating section 108. Then, when the user input a password on the password input screen, the password input by the user and the extracted master password are compared with each other. If the passwords match each other, the authentication is successful, whereas if not, it is unsuccessful.

Next, the CPU 101 determines whether or not the authentication using the master password is successful (step S706). If the authentication is successful, the copying operation is permitted (step S707). This causes a copy of the original read this time (a copy of the original document) to be output, and then the CPU 101 terminates the present process.

On the other hand, if the authentication is unsuccessful, the CPU 101 inhibits the copying operation, and causes error occurrence information to be displayed on the display 110 of the operating section 108 (step S708). This stops copying of the original read this time, so that a copy thereof is not output. Then, the CPU 101 terminates the present process.

Thus, by performing authentication using the master password, the copying of the original which is determined to be an original document is permitted, whereby a copy of the original as the original document is obtained. When the original is copied, the master password expressed by a dot pattern of small dots is lost, and the resulting copy contains only the general password expressed by a dot pattern of large dots.

If it is determined in the step S703 that the original read this time is a copy of the original document, the CPU 101 performs authentication using the general password so as permit copying of the original (step S705). To execute the authentication, the password input screen is displayed on the display 110 of the operating section 108. Then, when the user inputs a password on the password input screen, the password input by the user and the extracted general password are compared with each other. If these passwords match each other, the authentication is successful, whereas if not, it is unsuccessful.

Then, the CPU determines whether or not the authentication using the general password is successful (step S706). If the authentication is successful, the copying operation is permitted (step S707). This causes a copy of the original read this time (a copy of the copy (i.e. a second copy) or a more-th copy of the original document) to be output. Then, the CPU 101 terminates the present process.

On the other hand, if the authentication is unsuccessful, the CPU 101 inhibits the copying operation, and causes error occurrence information to be displayed on the display 110 of the operating section 108 (step S708). This stops the copying of the original read this time, so that a copy thereof is not output. Then, the CPU 101 terminates the present process.

Thus, by performing authentication using the general password, the copying of the original determined to be a copy of the original document is permitted, whereby a copy of the original (i.e. a second or more-th copy of the original document) is obtained.

From the above, according to the present embodiment, it is possible to permit copying of the original in a manner discriminating between an original document and a copy of the original document. Further, it is possible to manage users permitted to copy an original document and users permitted to copy a copy of the original document in a discriminating manner, whereby predetermined levels of security can be ensured for the respective kinds of copying.

In the present embodiment, as a condition for permitting copying of an original document or a copy of the original document, a master password or a general password is used, and authentications are performed using these passwords. Instead of this, authentications may be performed using a user ID or an URL of a policy server, and the copying may be permitted based on the results of such authentication.

Further, only the authentication using the general password may be caused to be executed by a policy server.

Furthermore, in the present embodiment, it is determined whether or not the read original is an original document or a copy of the original document, by making use of copy characteristics in which copying of the original document causes small dots to be lost. Instead of this, it may be determined whether or not the read original is an original document or a copy of the original document, depending on whether a background patter image (background pattern information) appears on the read original.

Figure 8:
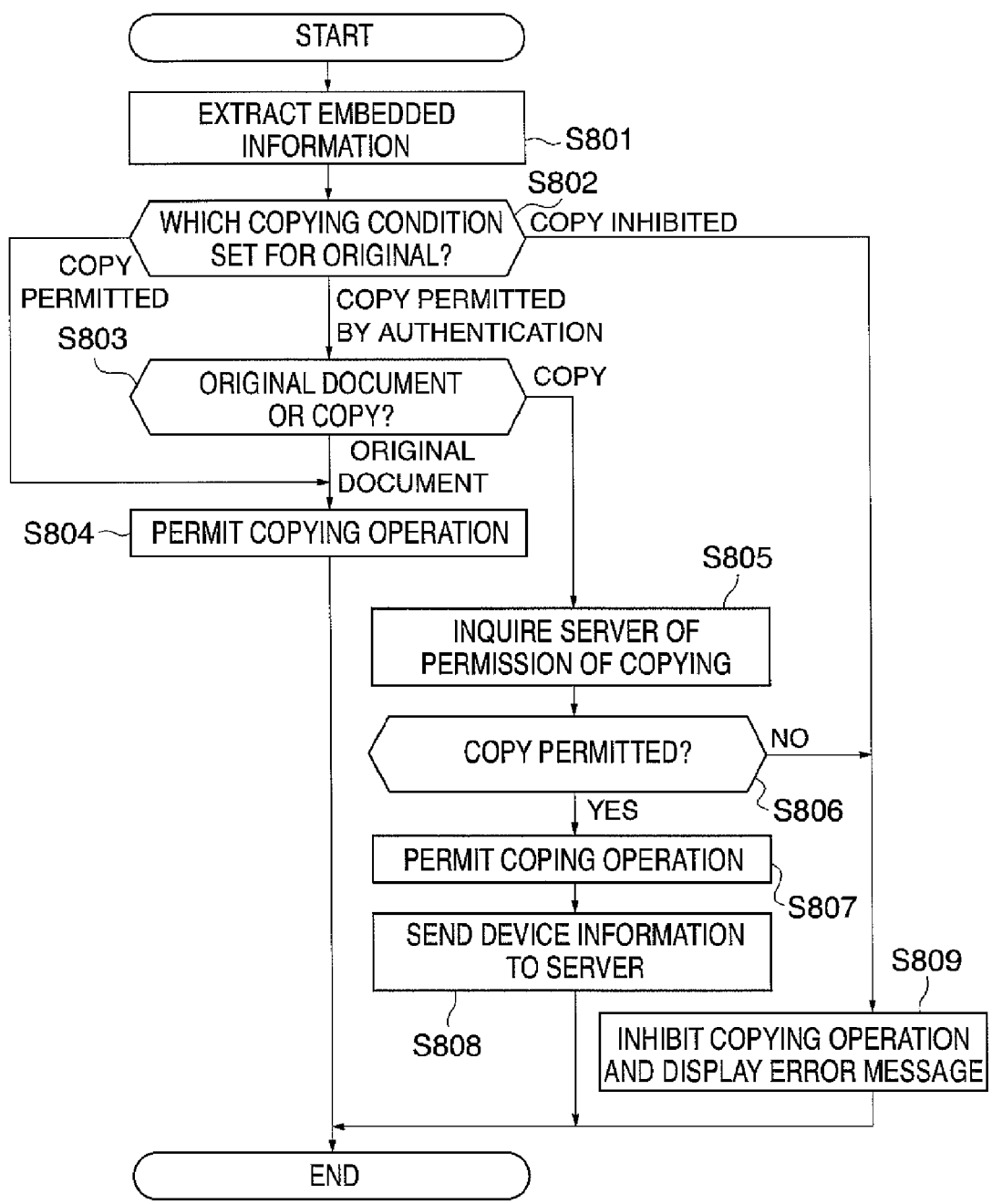
FIG. 8 is a copy control process executed by an image processing apparatus according to a second embodiment of the present invention.

Next, a description will be given of a second embodiment of the present invention with reference to FIG. 8. FIG. 8 is a flowchart of a copy control process executed by an image processing apparatus according to the second embodiment of the present invention. Now, the present embodiment has the same construction as that of the first embodiment, and hence description thereof is omitted. Further, the components parts of the present embodiment will be designated using the same reference numerals as those of the first embodiment.

The present embodiment is distinguished from the first embodiment in that the URL information (address information) of a policy server (authentication server) and copy permission information indicating permission of copying are used as conditions for permitting copying of an original document or a copy of the original document.

More specifically, in the original, there are embedded the URL information of the policy server and the copy permission information indicating permission of copying. Here, the URL information of the policy server is expressed by a dot pattern of such large dots as will not be lost due to the copying characteristics. In contrast, the copy permission information is expressed by a dot pattern of such small dots as will be lost due to the copying characteristics.

In the present embodiment, if both the URL information of the policy server and the copy permission information indicating permission of copying are extracted as the embedded information from an original, it is determined that "copy permitted based on authentication using a policy server" is set. Further, if the URL information of the policy server alone is extracted, it is similarly determined that "copy permitted based on authentication" is set.

Then, if it is determined that "copy permitted based authentication using a policy server" is set, it is determined whether or not the original is an original document or a copy of the original document. Here, if both the URL information of the policy server and the copy permission information indicating permission of copying are extracted, it is determined that the original is an original document. Then, a copying operation on the original determined to be an original document is permitted without performing the authentication using the master password as performed in the first embodiment.

On the other hand, if only the URL information of the policy server is extracted from the original, it is determined that the original is a copy of the original document. In this case, to permit copying of the original, the image processing apparatus 304 (305) makes an inquiry as to permission of copying by accessing the policy server using the above URL information. The policy server authenticates the user who is about to copy the original, and returns results of the authentication to the image processing apparatus 304 (305). Then, the image processing apparatus 304 (305) permits or inhibits copying of the original based on the results of the authentication returned from the policy server.

Next, a description will be given of a copy control process executed by the image processing apparatus 304 (305) according to the present embodiment with reference to FIG. 8. The copy control process shown in the flowchart of FIG. 8 is executed by the CPU 101 for each original read by the scanner 112. In the illustrated example, the description is given assuming that the sever 303 appearing in FIG. 1 serves as the policy server.

As shown in FIG. 8, the CPU 101 analyzes image data sent from the scanner 112, and extracts information embedded in the image read this time (step S801). If embedded information is extracted, the CPU 101 determines based on the extracted embedded information which of "copy permitted", "copy inhibited", and "copy permitted based on authentication using a policy server" is set (step S802). Here, there are a case whether both of the URL information of the policy server and the copy permission information are extracted and a case where only the URL information is extracted. In such cases, it is determined that the copying condition of "copy permitted based on authentication using a policy server" is set. Further, if no embedded information is extracted, the CUP 101 determines that "copy permitted" is set.

Now, if "copy permitted" is set for the original read this time, the CPU 101 permits a copying operation (step S804). On the other hand, if "copy inhibited" is set for the original read this time, the CPU 101 inhibits the copying operation, and causes error occurrence information to be displayed on the display 110 (step S810) This inhibits the copying of the original read this time.

If "copy permitted based on authentication using a policy server" is set for the original read this time, the CPU 101 determines whether or not the original read this time is an original document or a copy of the original document (step S803). In the illustrated example, if the URL information of the policy server and the copy permission information are extracted, it is determined that the original read this time is an original document. On the other hand, if only the URL information of the policy server is extracted but no copy permission information is extracted, it is determined that the original read this time is a copy of the original document.

If it is determined in the step S803 that the original read this time is an original document, the CPU 101 permits a copying operation (step S804). This causes a copy of the original read this time (a copy of the original document) to be output. Then, the CPU 101 terminates the present process.

Thus, the copying of the original determined to be an original document is permitted by the copy permission information embedded in the original, whereby a copy of the original, which is an original document, is obtained. The copying of the original causes the copy permission information expressed by a dot pattern of small dots to be lost, and the resulting copy has only the URL information of the policy server embedded therein which is expressed by a dot pattern of large dots.

If it is determined in the step S803 that the original read this time is a copy of the original document, the CPU 101 accesses the policy server (server 303) using the extracted URL information. Then, the CPU 101 makes an inquiry to the policy server (server 303) whether or not the copying of the original may be permitted (step S805). In the present example, an input screen for inputting user information, such as the password assigned to the user and the user ID, is displayed on the display 110 of the operating section 108. Then, the inquiry including the user information input via the input screen by the user is sent to the policy server.

Upon reception of the inquiry, the policy server (server 303) determines based on the user information contained in the inquiry whether to permit or inhibit the copying of the original, and sends in return information indicating copy permission or copy inhibition to the image processing apparatus 304 (305). For example, the policy server (server 303) determines whether or no the user identified by the user information has an authority to copy the original.

The CPU 101 determines whether or not the information received in return from the policy server is copy permission or copy inhibition (step S806). Here, if the information received in return from the policy server is copy permission, the CPU 101 permits the copying operation (step S807). Next, the CPU 101 sends device information for identifying the image processing apparatus that performs copying (information for indentifying the image processing apparatus 304 (305)) and the like to the policy server via the network interface card 107 (step S808). Then, the CPU 101 terminates the present process.

On the other hand, if the information received in return from the policy server is copy inhibition, the CPU 101 inhibits the copying operation, and causes error occurrence information to be displayed on the display 110 of the operating section 108 (step S809). This stops the copying of the original read this time. Then, the CPU 101 terminates the present process.

Figure 9:
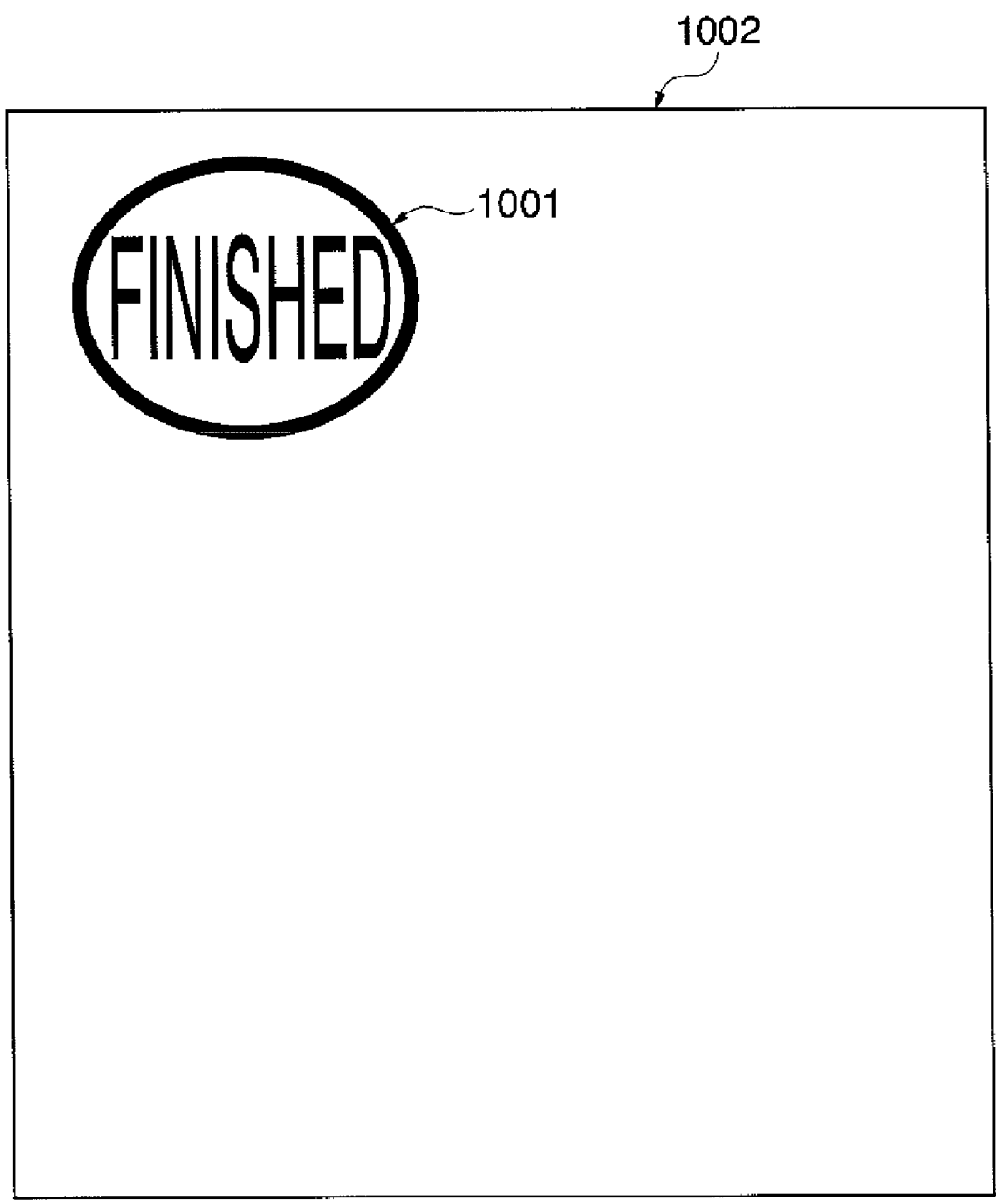
FIG. 9 is a view showing an example of a copied state-indicating image added to a copy when an original document is copied by an image processing apparatus according to a third embodiment of the present invention.
Figure 10:
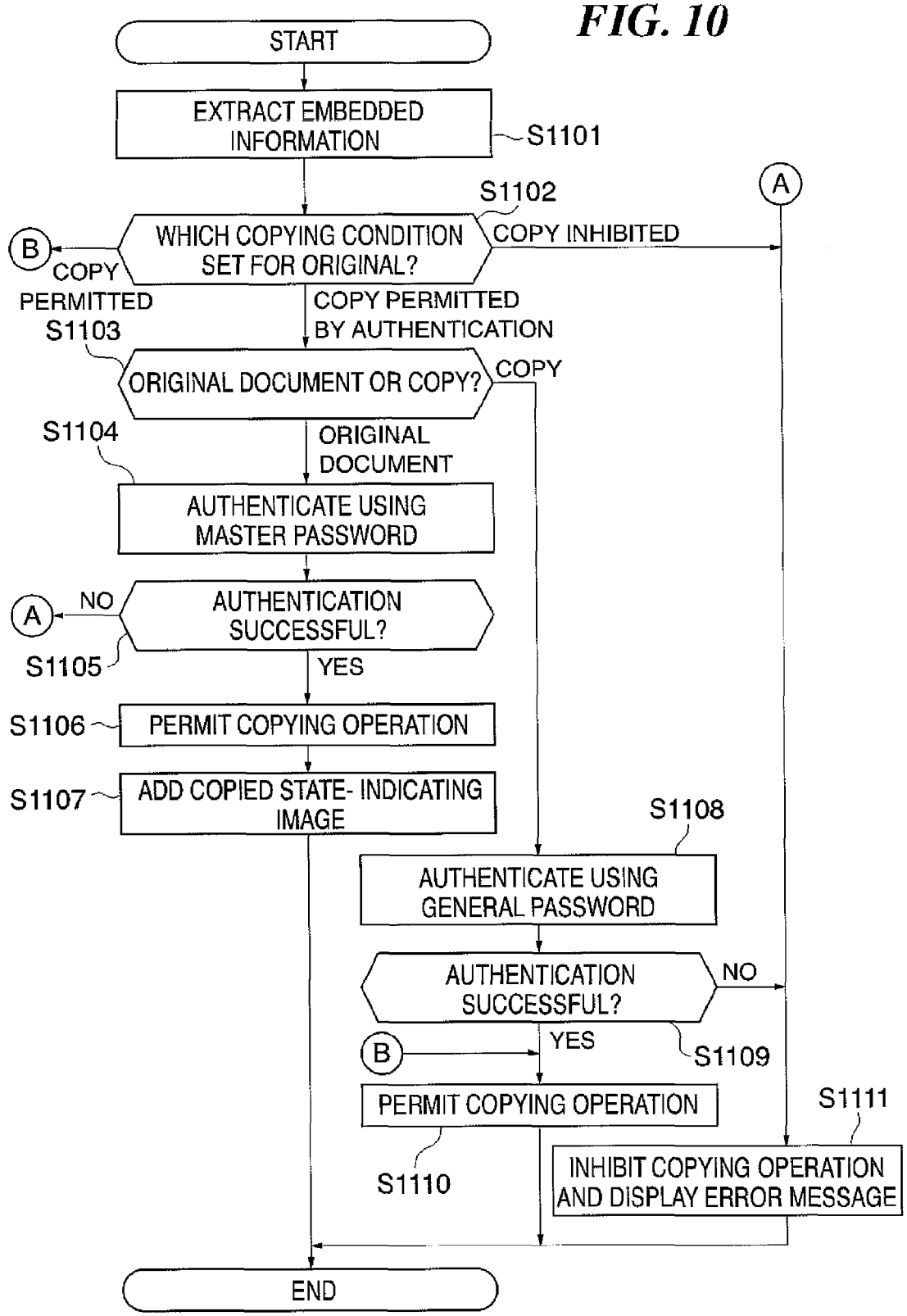
FIG. 10 is a copy control process executed by an image processing apparatus according to the third embodiment of the present invention.

Next, a third embodiment of the present invention will be described with reference to FIGS. 9 and 10. FIG. 9 is a diagram showing an example of a copied state-indicating image (copy information) added to a copy of an original document when the original document is copied by an image processing apparatus according to the third embodiment of the present invention. FIG. 10 is a flowchart of a copy control process executed by the image processing apparatus according to the third embodiment. The present invention has the same construction as that of the first embodiment, and a description thereof is omitted. Further, the components parts of the present embodiment will be designated using the same reference numerals as those of the first embodiment.

In the present embodiment, similarly to the first embodiment, when copying an original in which a password formed by a dot pattern is embedded, the password is extracted, and based on authentication using the password, the copy operation is permitted or inhibited.

However, the present embodiment is distinguished from the first embodiment in that when copying an original document, a copied state-indicating image is added to a copy of the original document. Further, the present embodiment is distinguished from the first embodiment in that it is determined from the presence or absence of the copied state-indicating image whether or not the original read this time is an original document or a copy of the original document.

More specifically, the image processing apparatus 304 (305) according to the present embodiment adds a copied state-indicating image 1001 to a copy 1002 of the original as shown in FIG. 9. The copied state-indicating image 1001 may be a visible image or an image having a high invisibility. When copying a copy 1002 having the copied state-indicating image added thereto, an image of the copy 1002 is read by the scanner 112, and the copied state-indicating image 1002 added thereto is recognized. This causes the copy 1002 to be determined to be a copy of an original document.

Next, a description will be given of a copy control process executed by the image processing apparatus 304 (305) according to the present embodiment with reference to FIG. 10. The copy control process shown by the flowchart of FIG. 10 is executed by the CPU 101 for each original read by the scanner 112.

When a copy stat instruction is input by the user, the scanner 112 starts reading an image of an original set thereon. Image data obtained by reading of the image is sent from the scanner 112 to the CPU 101 via the device interface 106.

As shown in FIG. 10, the CPU 101 analyzes the image data sent from the scanner 112, and extracts embedded information embedded in the image read this time (step S1101). Then, the CPU 101 determines based on the extracted embedded information which of "copy permitted", "copy inhibited", and "copy permitted based on authentication using a password" is set (step S1102). Here, there are a case whether both of the master password and the general password are extracted as the embedded information and a case where only the general password is extracted as the embedded information. In such cases, it is determined that "copy permitted based on authentication using a password" is set as the copying condition.

If "copy permitted" is set for the original read this time, the CPU 101 permits a copying operation (step S1110). This causes the image processing section 206 to perform a predetermined image process on the image data, and then convert the processed image data into image data which the printer 113 can interpret. The resulting image data is once stored in the memory 111, and then sent to the printer 113. The printer 113 forms an image on a sheet based on the image data, and outputs the sheet i.e. a copy of the original.

If "copy inhibited" is set for the original read this time, the CPU 101 inhibits the copying operation, and causes error occurrence information to be displayed on the display 110 (step S1111). This stops copying of the original read this time, so that a copy thereof is not output.

If "copy permitted based on authentication using a password" is set for the original read this time, the CPU 101 determines whether or not the original read this time is an original document or a copy of the original document (step S1103). Here, it is determined, depending on whether or not the copied state-indicating image is present, whether the original the original read this time is an original document or a copy of the original document. If the copied state-indicating image is not present, it is determined that the original read this time is an original document, whereas if the copied state-indicating image is present, it is determined that the original read this time is a copy of the original document.

If it is determined in the step S1103 that the original read this time is an original document, the CPU 101 performs authentication using the master password (first authentication) so as to enable copying of the original (step S1104). In this authentication, the password input screen is displayed on the display 110 of the operating section 108. Then, when the user input a password on the password input screen, the password input by the user and the extracted master password are compared with each other. If the passwords match each other, the authentication is successful, whereas if not, it is unsuccessful.

Next, the CPU 101 determines whether or not the authentication using the master password is successful (step S1105). If the authentication is successful, the copying operation is permitted (step S1106). Then, the CPU 101 adds image data of the copied state-indicating image to the image data of the original read this time (step S1107). This causes a copy having the copied state-indicating image added thereto (a copy of the original document) to be output. Then, the CPU 101 terminates the present process.

On the other hand, if the authentication is unsuccessful, the CPU 101 inhibits the copying operation, and causes error occurrence information to be displayed on the display 110 of the operating section 108 (step S1111). This stops copying of the original read this time, so that a copy thereof is not output. Then, the CPU 101 terminates the present process.

Thus, the copying of the original determined to be an original document is permitted by performing authentication using the master password, whereby a copy of the original, which is the original document, is obtained. When the original is copied, the master password expressed by a dot pattern of small dots is lost, and the resulting copy contains only the general password expressed by a dot pattern of large dots.

If it is determined in the step S1103 that the original read this time is a copy of the original document, the CPU 101 performs authentication using the general password so as permit copying of the original (step S1108). To execute the authentication, the password input screen is displayed on the display 110 of the operating section 108. Then, the password input by the user and the extracted general password are compared with each other. If these passwords match each other, the authentication is successful, whereas if not, it is unsuccessful.

Then, the CPU determines whether or not the authentication using the general password is successful (step S1109). If the authentication is successful, the copying operation is permitted (step S1110). This causes a copy of the original read this time (a copy of the copy (i.e. a second or more-th copy) of the original document) to be output. Then, the CPU 101 terminates the present process.

On the other hand, if the authentication is unsuccessful, the CPU 101 inhibits the copying operation, and causes error occurrence information to be displayed on the display 110 of the operating section 108 (step S1111). This stops the copying of the original read this time, so that a copy thereof is not output. Then, the CPU 101 terminates the present process.

Thus, the copying of the original determined to be a copy of the original document is permitted by performing authentication using the general password, whereby a copy of the original (i.e. a second or a more-th copy of the original document) is obtained.

As described above, in the present embodiment, whether or not a read original is an original document or a copy of the original document is determined depending on whether or not a copied state-indicating image is present. Then, the copying of the original determined to be an original document is permitted by performing authentication using a master password, whereas the copying of the original determined to be a copy of the original document is permitted by performing authentication using a general password.

Although in the first to third embodiments described above, the process of copying is taken as an example of a specific process performed based on a read image, this is not limitative, but the specific process may be facsimile transmission or conversion of the document into an electronic format. For example, in the step S707 in FIG. 7, facsimile transmission of image data obtained by the scanner 112 may be permitted. Alternatively, conversion of image data obtained by the scanner 112 to a file of a specific data format may be permitted.

It is to be understood that the present invention may also be accomplished by supplying a system or an apparatus with a storage medium in which a program code of software, which realizes the functions of each of the above described embodiments is stored, and causing a computer (or CPU or MPU) of the system or apparatus to read out and execute the program code stored in the storage medium.

In this case, the program code itself read from the storage medium realizes the functions of each of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of each of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of each of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-057372 filed Mar. 7, 2007, which is hereby incorporated by reference herein in its entirety.

What is claimed is:

1. An image processing apparatus comprising:
a reader unit configured to read an image on an original;
an extracting unit configured to extract specific information contained in the image read by said reader unit;
a determining unit configured to determine based on the information extracted by said extracting unit whether or not the original is an original document;
an authenticating unit configured to perform user authentication using respectively different pieces of authentication information in respective cases where the original is determined to be an original document and where the original is not determined to be an original document; and
a control unit configured to restrict a specific process based on the image read by said reader unit, according to a result of the user authentication by said authenticating unit, wherein the specific information comprises first information which is lost by copying of an original document and second information which is not lost by copying of an original document, wherein said extracting unit is capable of extracting the first information and the second information, the first information and second information, when extracted, representing different authentication information, wherein said determining unit determines that the original is an original document when the first information and the second information are extracted by said extracting unit, and determines that the original is not an original document when the second information is extracted by said extracting unit without the first information being extracted by said extracting unit, and wherein said authenticating unit uses the first information as the authentication information when the original is determined to be an original document, and uses the second information as the authentication information when the original is not determined to be an original document.

2. An image processing apparatus as claimed in claim 1, wherein the second information is either a password or address information of an authentication server that determines whether the specific process on the original is to be permitted.

3. An image processing apparatus as claimed in claim 1, wherein said extracting unit is capable of extracting background pattern information appearing as a background pattern on a copy obtained by copying of an original document, and wherein said determining unit determines that the original is an original document when the background pattern information is extracted by said extracting unit, and determines that the original is not an original document when the background pattern information is not extracted by said extracting unit.

4. An image processing apparatus as claimed in claim 1, wherein said extracting unit is capable of extracting copy information added to a copy of an original document for indicating that the original is a copy of the original document, and wherein said determining unit determines that the original is an original document when the copy information is not extracted by said extracting unit, and determines that the original is not an original document when the copy information is extracted by said extracting unit.

5. An image processing apparatus as claimed in claim 1, wherein the first information is embedded as a dot pattern formed of a plurality of small dots seemingly randomly arranged, and the second information is embedded as a dot pattern formed of a plurality of large dots seemingly randomly arranged.

6. An image processing apparatus as claimed in claim 1, comprising a display unit configured to display error occurrence information indicating occurrence of an error, when said control unit restricts the specific process based on the image read by said reader unit.

7. An image processing apparatus as claimed in claim 1, wherein the first information and the second information, when extracted, represent different passwords.

8. An image processing apparatus as claimed in claim 7, wherein the authentication unit is configured to perform the user authentication by receiving a user-input password and comparing the user-input password with one or both of the different passwords represented by the extracted first information and second information.

* * * * *